United States Patent
Frasure et al.

(10) Patent No.: US 9,970,837 B2
(45) Date of Patent: May 15, 2018

(54) DETECTOR UTILIZING AN ADJUSTMENT SCREW AND A BELLOWS

(71) Applicant: Kidde Technologies Inc., Wilson, NC (US)

(72) Inventors: David Frasure, Wilson, NC (US); Steven Wallace, Raleigh, NC (US)

(73) Assignee: KIDDE TECHNOLOGIES INC., Wilson, NC (US)

( * ) Notice: Subject to any disclaimer, the term of this patent is extended or adjusted under 35 U.S.C. 154(b) by 73 days.

(21) Appl. No.: 14/755,321

(22) Filed: Jun. 30, 2015

(65) Prior Publication Data

US 2017/0003185 A1 Jan. 5, 2017

(51) Int. Cl.
| | | |
|---|---|---|
| *G01L 7/00* | (2006.01) | |
| *G01L 9/00* | (2006.01) | |
| *H01H 35/24* | (2006.01) | |
| *H01H 35/26* | (2006.01) | |
| *H01H 35/32* | (2006.01) | |
| *G01L 7/06* | (2006.01) | |
| *G01L 13/02* | (2006.01) | |
| *G01L 19/00* | (2006.01) | |
| *G01L 19/06* | (2006.01) | |

(52) U.S. Cl.
CPC .............. *G01L 9/0033* (2013.01); *G01L 7/06* (2013.01); *H01H 35/245* (2013.01); *H01H 35/265* (2013.01); *H01H 35/2657* (2013.01); *H01H 35/32* (2013.01); *G01L 7/00* (2013.01); *G01L 13/02* (2013.01); *G01L 13/025* (2013.01); *G01L 19/0038* (2013.01); *G01L 19/0645* (2013.01)

(58) Field of Classification Search
CPC ...................................................... G01L 13/025
USPC ............................................................ 73/716
See application file for complete search history.

(56) References Cited

U.S. PATENT DOCUMENTS

| | | | |
|---|---|---|---|
| 2,658,120 A | 11/1953 | Murphy | |
| 2,662,946 A * | 12/1953 | Schweiss | H01H 35/32 200/83 S |
| 2,707,001 A * | 4/1955 | Hathaway | G01L 13/02 336/135 |
| 3,122,728 A | 2/1964 | Lindberg, Jr. | |
| 3,354,722 A * | 11/1967 | Waite | G01L 13/02 73/716 |

(Continued)

OTHER PUBLICATIONS

EPSR for EP Application No. 16177138.1, dated Nov. 2, 2016, 9 pages.

(Continued)

*Primary Examiner* — Clayton E Laballe
*Assistant Examiner* — Kevin Butler
(74) *Attorney, Agent, or Firm* — Cantor Colburn LLP (57) ABSTRACT

A detector that detects an alarm and/or fault condition with respect to a pressure of a medium is provided. The detector comprises a housing comprising an access tube configured to receive a medium and a bellows fixed to the housing comprising a cavity and a first contact surface. The detector also comprises an adjustment screw positioned within the cavity of the bellows, coupled to the housing via an insulation member, and comprising a second contact surface. The detector is further configured to detect a change in pressure of the medium based on whether the first contact surface and the first contact surface are in electrical communication.

11 Claims, 7 Drawing Sheets

(56) References Cited

U.S. PATENT DOCUMENTS

| | | | | |
|---|---|---|---|---|
| 3,771,552 | A | * | 11/1973 | Watanabe .......... G05D 16/2066 |
| | | | | 137/487.5 |
| 5,136,278 | A | | 8/1992 | Watson et al. |
| 5,325,901 | A | | 7/1994 | Olney et al. |
| 5,691,702 | A | | 11/1997 | Hay |
| 8,033,176 | B2 | * | 10/2011 | Esnouf ................ A61M 16/044 |
| | | | | 73/716 |
| 2006/0150742 | A1 | * | 7/2006 | Esnouf ................ A61M 16/044 |
| | | | | 73/716 |
| 2006/0236774 | A1 | * | 10/2006 | Coleman ............... G01L 9/0039 |
| | | | | 73/715 |
| 2009/0236205 | A1 | | 9/2009 | Nalla et al. |
| 2010/0218612 | A1 | * | 9/2010 | Ohtani .................. G01L 13/025 |
| | | | | 73/716 |
| 2011/0121977 | A1 | | 5/2011 | Nalla et al. |
| 2012/0120380 | A1 | * | 5/2012 | Lyons .................... G01B 13/12 |
| | | | | 355/53 |
| 2014/0262723 | A1 | * | 9/2014 | Frasure .................. G08B 17/04 |
| | | | | 200/83 Y |
| 2015/0206678 | A1 | * | 7/2015 | Wallace ................. H01H 35/26 |
| | | | | 200/83 R |
| 2016/0110979 | A1 | * | 4/2016 | Frasure ................ G08B 29/043 |
| | | | | 340/593 |
| 2016/0133106 | A1 | * | 5/2016 | Wallace ................. H01H 35/34 |
| | | | | 340/626 |
| 2017/0003185 | A1 | * | 1/2017 | Frasure ..................... G01L 7/06 |

OTHER PUBLICATIONS

Office Action dated Sep. 25, 2017, issued in corresponding European Application No. 16177138.1.

* cited by examiner

DETECTOR UTILIZING AN ADJUSTMENT SCREW AND A BELLOWS

BACKGROUND OF THE INVENTION

The present disclosure relates generally to a detector utilizing an adjustment screw and a bellows, and more specifically, to alarm and integrity detectors that identify a change in pressure based on a contact between a bellows and an adjustment screw.

Typical pneumatic switch systems detect fault conditions, i.e., increase or decrease in pressure, by utilizing a contact pin and a deformable diaphragm. For fault detectors, the contact pin and the deformable diaphragm are in electrical continuity until the fault condition causes the electrical connectivity to break. For example, with respect to detecting a decrease in pressure, a pneumatic switch system holds the deformable diaphragm in a deformed configuration against the contact pin. When the pressure in the pneumatic switch system leaks below a normal pressure condition, the deformable diaphragm returns to a normal configuration because there is not enough pressure to hold the deformed configuration. By returning to the normal configuration, the deformable diaphragm moves away from the contact pin and creates an open electrical circuit. The open electrical circuit indicates a fault condition of a pressure decrease.

Further, with respect to detecting an increase in pressure, a pneumatic switch system holds the deformable diaphragm in a normal configuration apart from the contact pin. When the pneumatic switch system receives pressure above a normal pressure condition, the additional pressure causes the deformable diaphragm to change into a deformed configuration. Once in the deformed configuration, the deformable diaphragm is in contact with the contact pin and creates a closed electrical circuit. The closed electrical circuit indicates an alarm condition of a pressure increase. Note that increases and decreases in the pressure can result from change is temperature and its effect on gases, such as helium, hydrogen (outgassing of hydrogen from a hydride titanium), etc.

Pneumatic switch systems with deformable diaphragms are expensive component parts that increase the overall cost of each pneumatic switch system.

BRIEF DESCRIPTION OF THE INVENTION

Embodiments include a detector utilizing an adjustment screw and a bellows to detect an alarm and/or fault condition with respect to a pressure of a medium. The detector comprises a housing comprising an access tube configured to receive a medium. The bellows is fixed to the housing comprising a cavity and a first contact surface. The adjustment screw is positioned within the cavity of the bellows, coupled to the housing via an insulation member, and comprising a second contact surface. The detector is further configured to detect a change in pressure of the medium based on whether the first contact surface and the first contact surface are in electrical communication.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Embodiments described herein relate to alarm and integrity detectors that identify a change in pressure based on a contact between a bellows and an adjustment screw.

Figure 1:
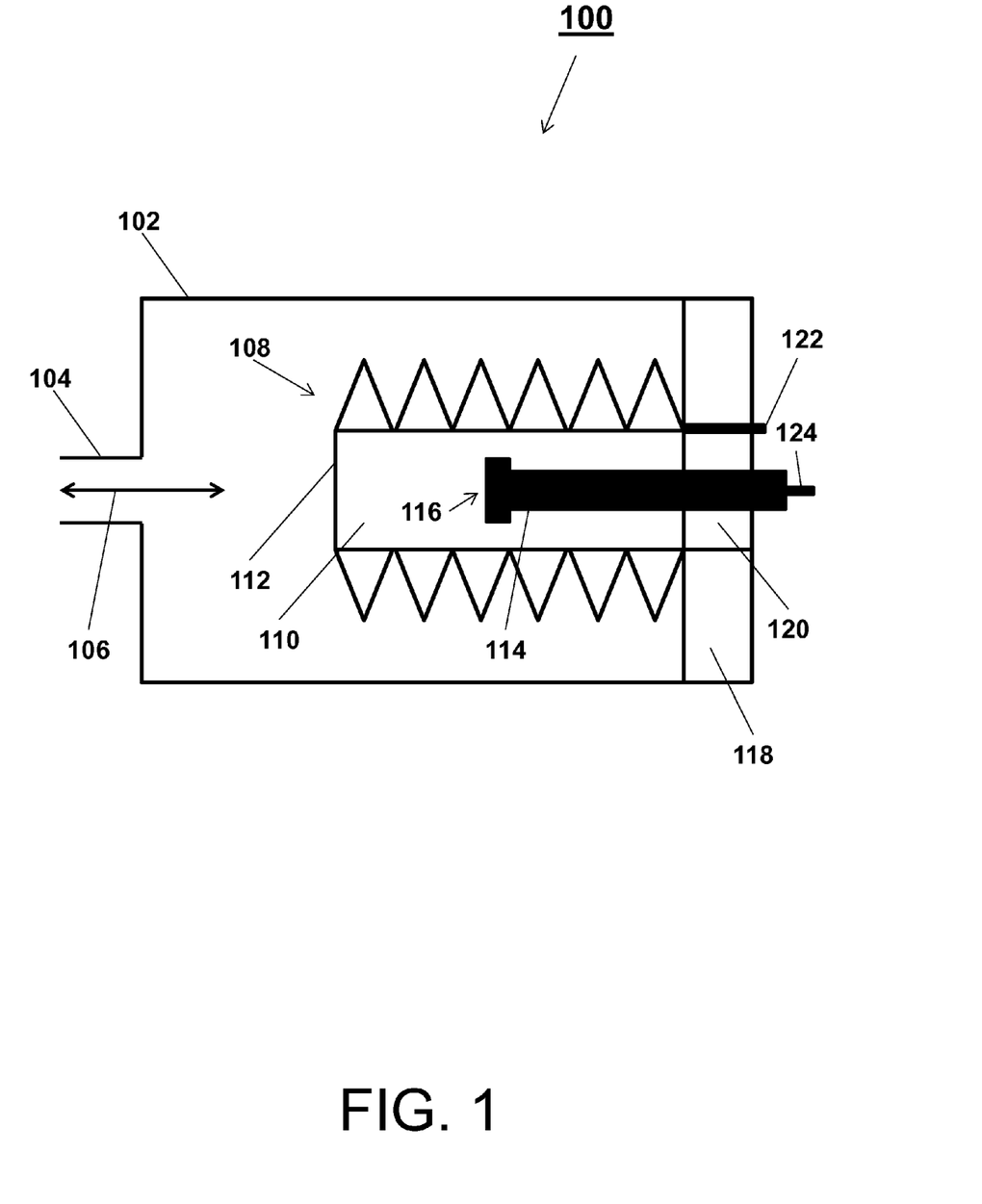
FIG. 1 is a diagram of a detector utilizing an adjustment screw and a bellows according to an embodiment of the invention.

Turning to FIG. 1, a diagram of a detector 100 is illustrated. The detector comprises a housing 102 that receives through an access tube 104 pressure 106. Inside the housing 102 is a bellows 108 that comprises a cavity 110 and a contact surface 112 (e.g., first contact surface). In general, a bellows is a flexible, accordion shaped tube that can compress or expand in response to the applied pressure 106. A bellows can be manufactured to meet specific parameters, with respect to spring rates, weight, durability, etc. In this way, different bellows may be employed in similar embodiments to monitor for a desired parameter. For example, a metal bellows with a high spring constant may be utilized to detect an increase in pressure, as the increase in pressure will compress the bellows. As another example, a metal bellows with a low spring constant may be utilized to detect a decrease in pressure, as the decrease in pressure will permit the bellows to expand.

Further, the detector 100 also includes a metal member called an adjustment screw 114. The adjustment screw 114 includes a contact surface 116 (e.g., second contact surface) and is nested within the cavity 110 of the bellows 108. The bellows 108 and the adjustment screw 114 are held in place within the housing 102 by an end cap 118 that comprises an insulation member 120. A depth of penetration of the adjustment screw 114 into the cavity 114 of the bellows can be adjusted by rotating the adjustment screw 114 in a clockwise or counter-clockwise fashion. In this way, the detector 100 can be calibrated as needed by rotating the adjustment screw 114 (e.g., even if the spring constant of the bellows 108 has changed over time) when the housing is charged to a desired detection pressure.

In addition, the end cap 118 is configured to permit the adjustment screw 114 and a bellows lead 122 to penetrate the housing 102, such that the bellows lead 122 and an adjustment screw lead 124 can connect to an external device that detects when a circuit between the bellows 108 and the adjustment screw 114 is open or closed. Alternative embodiments of the detector 100 can utilize the housing 102 itself as a lead for a bellows side of circuit in lieu of the bellows lead 102 (e.g., a metal bellows is fixed to a metal housing and electrically separated from the metal housing via an insulation member).

Figure 2:
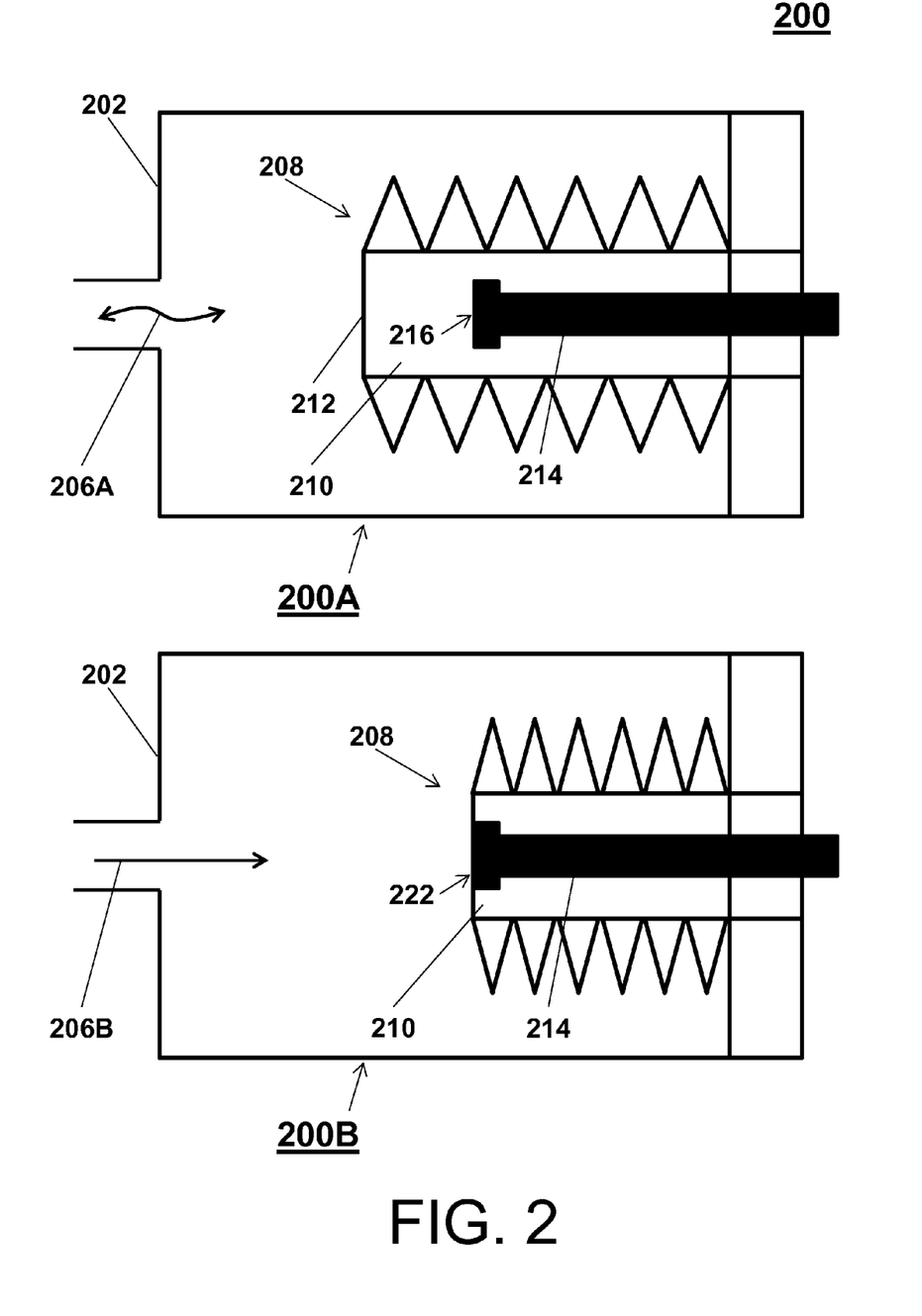
FIG. 2 is illustrates positions of an alarm detector according to an embodiment of the invention.
Figure 3:
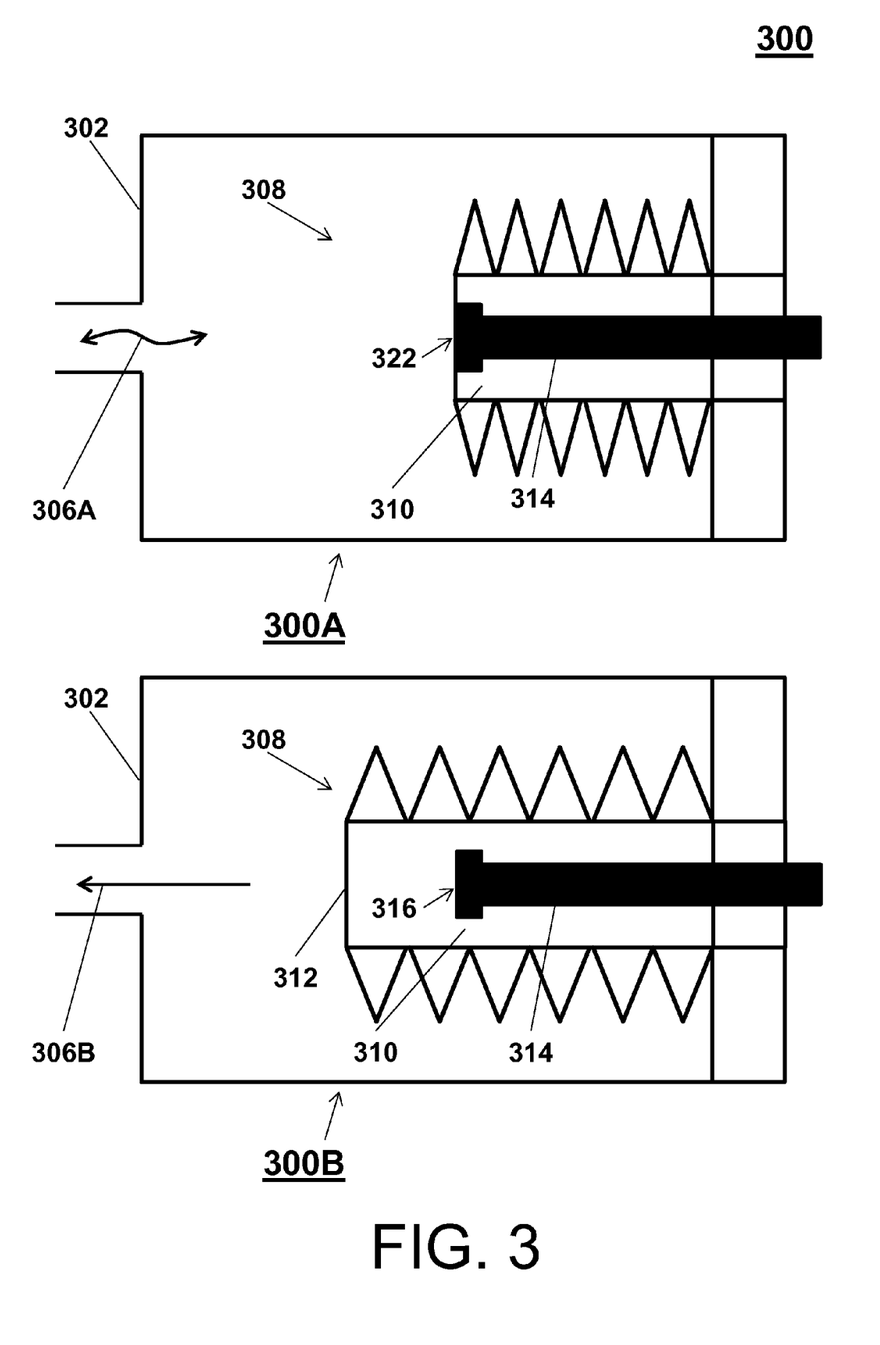
FIG. 3 is illustrates positions of an integrity detector according to an embodiment of the invention.

Embodiments of the detector 100 can be configured as an alarm switch as shown in FIG. 2 or a fault switch as shown in FIG. 3.

With respect to the alarm switch, an alarm detector 200 of FIG. 2 is illustrated with the bellows 208 in two positions 200A, 200B according to an embodiment of the invention. That is, when the pressure 206A is at a desired or normal pressure (as indicated by the wavy double arrow), the bellows 208 remains at a first position 200A. The first position 200A of the bellows 208 within the housing 202 is dictated by the spring constant of the bellows 208. Further, when the pressure 206B is at a higher than normal pressure (as indicated by the straight directional arrow), the bellows 208 is compressed to a second position 200B.

To calibrate the alarm detector 200, the housing 202 is charged with a medium at a compression pressure to be detected by the alarm detector 200 such that the bellows 108 is compressed to a second position 200B. Then, the adjustment screw 214 is rotated until the contact surface 216 in communication with the contact surface 212 at a connection point 222. Note that depending on the fidelity required for the adjustment screw 214, the threads on the adjustment screw 214 can be amongst a range of 40 to 64 threads per inch, or greater, if required. Thus, because the adjustment screw 214 is calibrated when the housing is charged at the specific compression pressure, a specific alarm condition will be detected when the bellows 208 is driven to the second position 200B.

With respect to the fault switch, a fault detector 300 of FIG. 3 is illustrated with the bellows 308 in two positions 300A, 300B according to an embodiment of the invention. That is, when the pressure 306A is at a standard or minimum normal pressure (as indicated by the wavy double arrow), the bellows 308 remains at a first position 300A. The first position 300A of the bellows 308 within the housing 302 is dictated by the spring constant of the bellows 308. Further, when the pressure 306B is at a lower than the minimum normal pressure (as indicated by the straight directional arrow), the bellows 308 expands to a second position 300B.

To calibrate the fault detector 300, the housing 302 is charged with a medium at a standard or minimum normal pressure such that the bellows 308 is compressed to a first position 200A. Then, the adjustment screw 314 is rotated until the contact surface 316 in communication with the contact surface 312 at a connection point 322. Again note that depending on the fidelity required for the adjustment screw 314, the threads on the adjustment screw 314 can be amongst a range of 40 to 64 threads per inch, or greater, if required. Thus, because the adjustment screw 314 is calibrated when the housing is charged at the standard or minimum normal pressure, a specific fault condition will be detected when the bellows 108 expands to the second position 300B.

Figure 4:
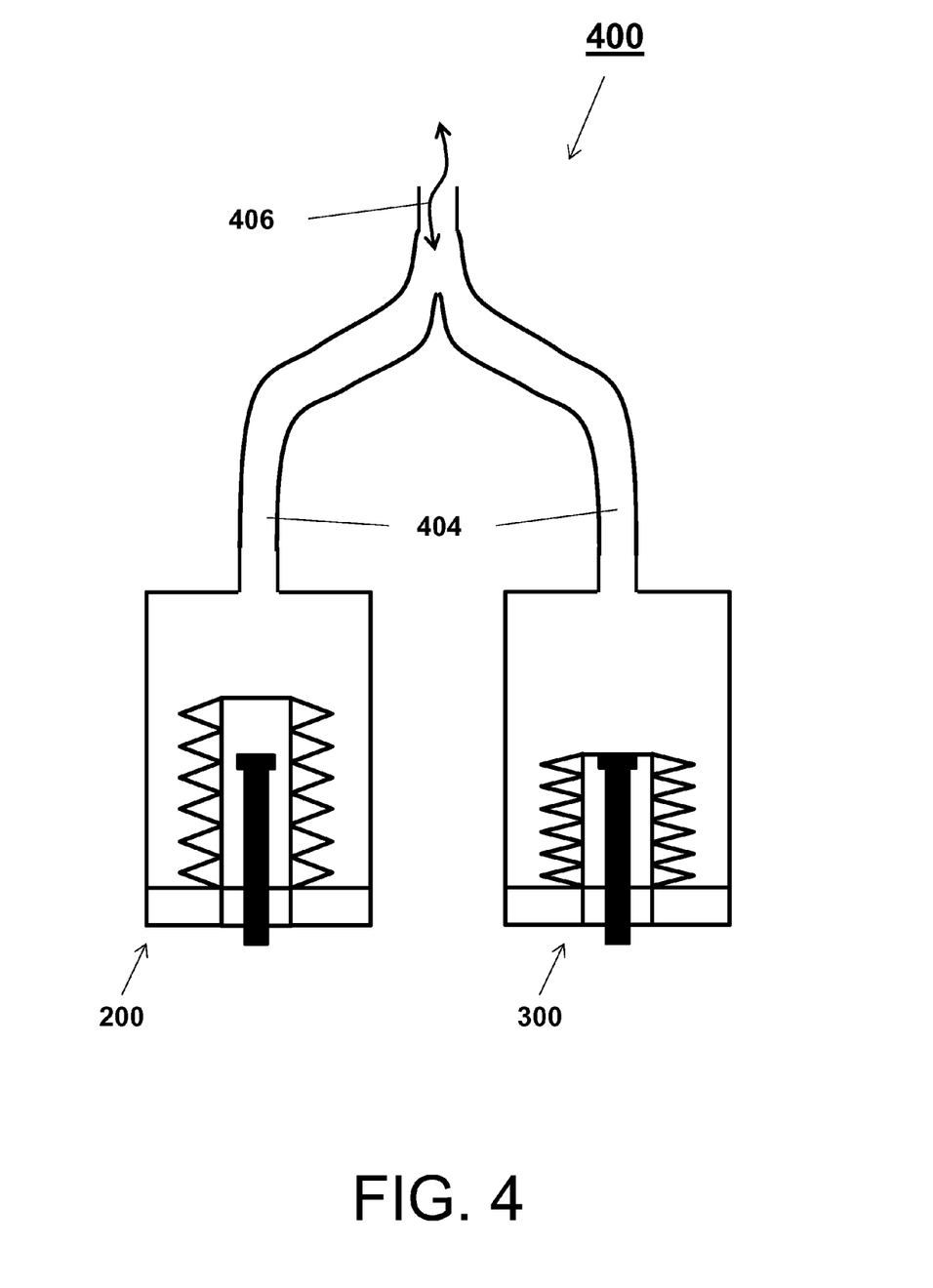
FIG. 4 is a diagram of a dual alarm and integrity detector according to an embodiment of the invention.

In view of the above, FIG. 4 is a diagram of a dual alarm and integrity detector 400 according to an embodiment of the invention. The dual alarm and integrity detector 400 comprises the alarm detector 200 and the fault detector 300. These detectors 200, 300 are connected by an access tube 404 that receives pressure 406. As illustrated, the pressure 406 is at a standard or minimum normal pressure (as indicated by the wavy double arrow), such that the alarm detector 200 and the fault detector 300 are respectively in the non-alarm/fault positions 200A, 300A.

Figure 5:
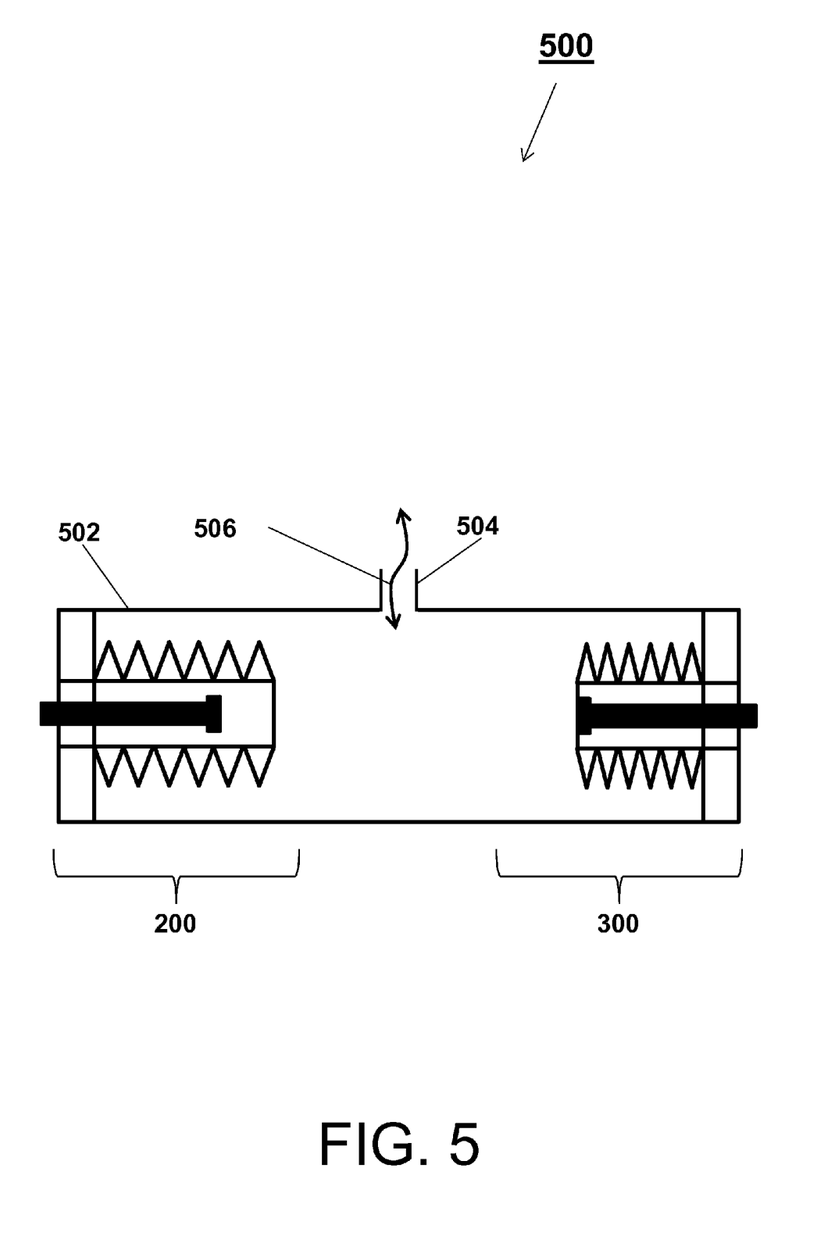
FIG. 5 is another diagram of a dual alarm and integrity detector according to an embodiment of the invention.

FIG. 5 is another diagram of a dual alarm and integrity detector 500 according to an embodiment of the invention. The dual alarm and integrity detector 500 also comprises the alarm detector 200 and the fault detector 300; yet, it is noted that these detectors 200, 300 are within the same housing 502. The housing 502, in turn, receives through an access tube 504 pressure 506. As illustrated, the pressure 506 is at a standard or minimum normal pressure (as indicated by the wavy double arrow), such that the alarm detector 200 and the fault detector 300 are respectively in the non-alarm/fault positions 200A, 300A.

Figure 6:
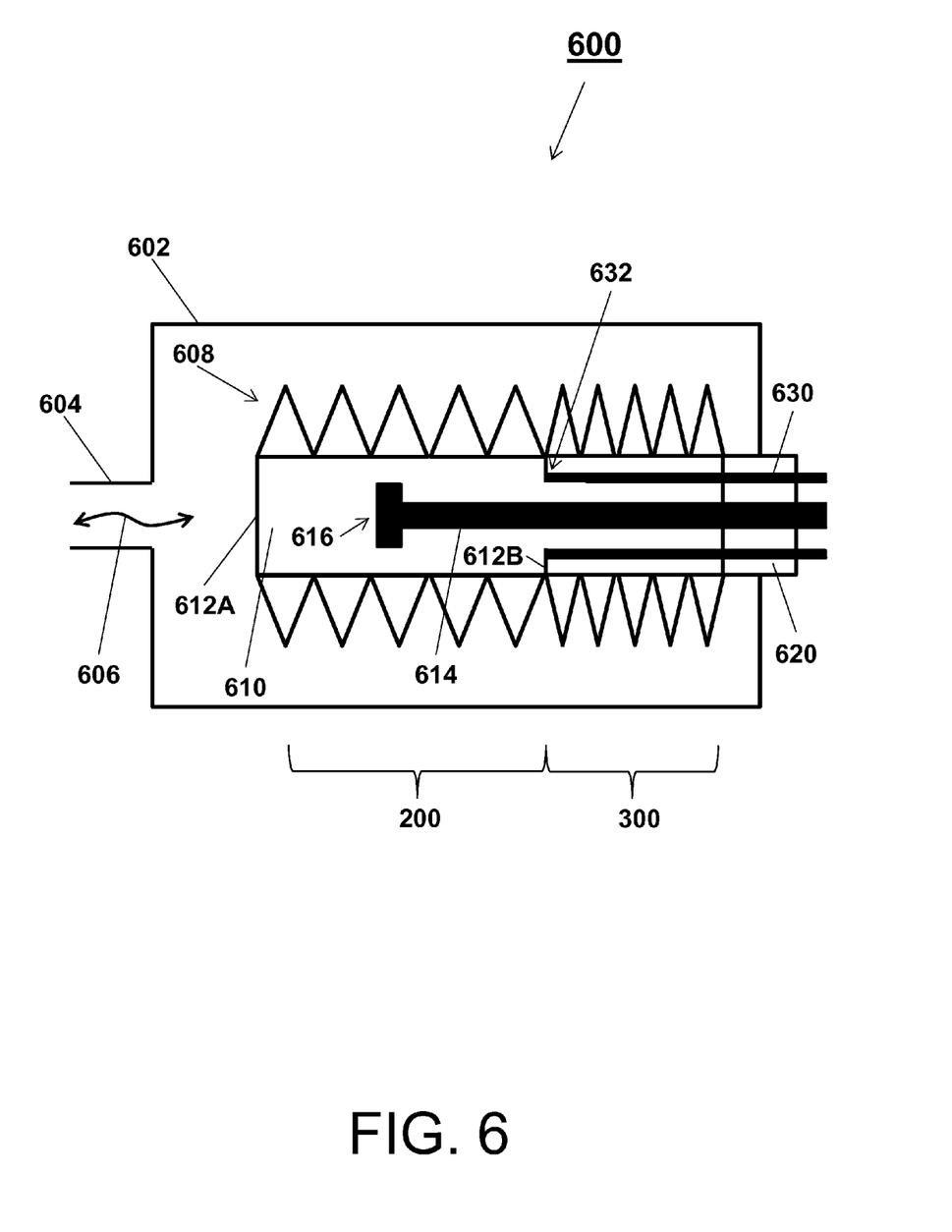
FIG. 6 is a diagram of a stackable bellows detector according to an embodiment of the invention.
Figure 7:
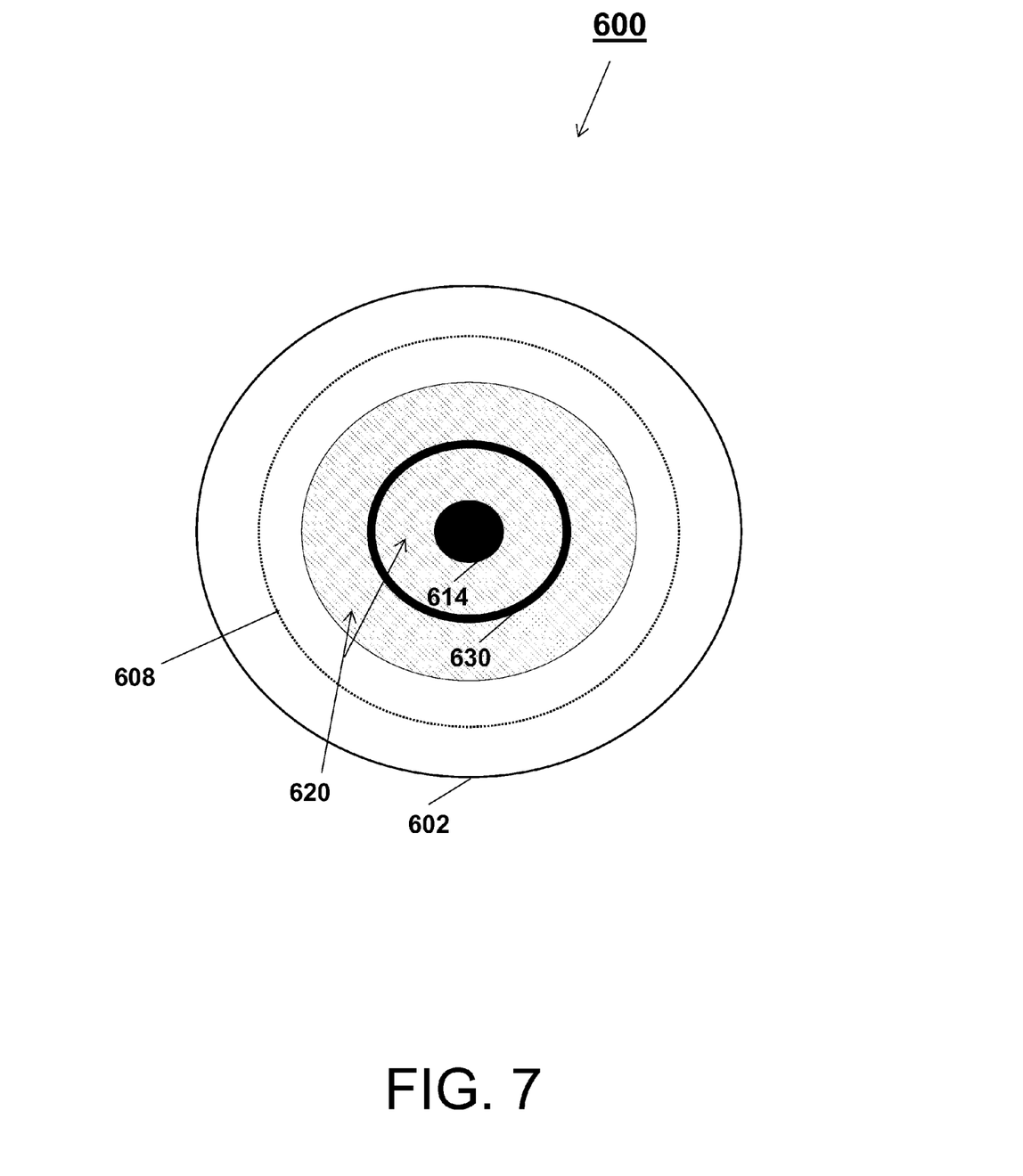
FIG. 7 is an alternate view of the stackable bellows detector of FIG. 6 according to an embodiment of the invention.

Turning now to FIGS. 6 and 7, a stackable bellows detector 600 is illustrated according to an embodiment of the invention, with FIG. 6 showing a profile view and FIG. 7 showing an end cap view. The stackable bellows detector 600 comprises a housing 602 that receives through an access tube 604 pressure 606. Inside the housing 602 is a dual bellows 608 that comprises a cavity 610, a tip contact surface 612A (e.g., first bellows surface), and a flange surface 612B (e.g., second bellows surface). The dual bellows 608 is a welded combination of the bellows 200 and the bellows 300 connected at the location of the flange 612B.

The stackable bellows detector 600 also includes an adjustment screw 614 comprising a contact surface 616 (e.g., screw surface). The adjustment screw 614 is nested within the cavity 610 of the dual bellows 608. The dual bellows 608 and the adjustment screw 614 are held in place within the housing 602 by an insulation member 620 built into the housing. Further, the stackable bellows detector 600 includes a threaded tube 630 comprising a contact surface 632 (e.g., tube surface). The threaded tube 630 is positioned between the dual bellows 608 and the adjustment screw 614.

Each bellows 200, 300 can be calibrated to detect corresponding pressure conditions. In this regard, the bellows 300 may generally be calibrated first, followed by the calibrating the bellows 200. To calibrate the bellows 300 of the stackable bellows detector 600, the housing 602 can be charged with a medium at a standard or minimum normal pressure such that the bellows 300 is compressed. Then, the threaded tube 630 is rotated until the contact surface 632 is in communication with the flange surface 612B.

To calibrate the bellows 200 of the stackable bellows detector 600, the housing 602 can be charged with a medium at a compression pressure to be detected such that the bellows 200 is compressed. Then, the adjustment screw 614 is rotated until the tip contact surface 612A is in communication with the contact surface 616.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:
1. A detector, comprising:
a housing comprising an access tube configured to receive a medium;
a bellows fixed to the housing comprising a cavity and a first contact surface;

an adjustment screw positioned within the cavity of the bellows, coupled to the housing via an insulation member, and comprising a second contact surface, wherein the detector is configured to detect a change in pressure of the medium based on whether the first contact surface and the second contact surface are in electrical communication, wherein the bellows is configured to compress when the change in pressure is an increase in pressure of the medium, wherein the detector is:
- an alarm detector configured to trigger when the first contact surface and the second contact surface are in electrical communication, or
- a fault detector configured to trigger when the first contact surface and the second contact surface are not in electrical communication.

2. The detector of claim 1, wherein the bellows is configured to expand when the change in pressure is a decrease in pressure of the medium.

3. The detector of claim 1, wherein a depth of penetration of the adjustment screw within the cavity is configured to be adjusted by rotating the adjustment screw.

4. The detector of claim 1, wherein the bellows is a first bellows of a plurality of bellows in the housing,
wherein the first bellows is configured to compress when the change in pressure is an increase in pressure of the medium, and
wherein the second bellows is configured to expand when the change in pressure is a decrease in pressure of the medium.

5. The detector of claim 4, wherein the first and second bellows are welded in a stack.

6. The detector of claim 4, comprising:
a threaded tube positioned within the cavity between the bellows and the adjustment screw, coupled to the housing via an insulation member, and comprising a third contact surface.

7. The detector of claim 6, wherein a depth of penetration of the threaded tube within the cavity is configured to be adjusted by rotating the threaded tube.

8. A dual pressure detector, comprising:
an access tube configured to receive and supply a medium to the dual pressure detector;
a bellows comprising a cavity and a first contact surface;
an adjustment screw positioned within the cavity of the bellows and comprising a second contact surface,
wherein the dual pressure detector is configured to detect a change in pressure of the medium based on whether the first contact surface and the second contact surface are in electrical communication,
wherein the dual pressure detector is:
- an alarm detector configured to trigger when the first contact surface and the second contact surface are in electrical communication, or
- a fault detector configured to trigger when the first contact surface and the second contact surface are not in electrical communication.

9. The dual pressure detector of claim 8, comprising:
a second bellows comprising a second cavity and a third contact surface;
a second adjustment screw positioned within the second cavity of the second bellows and comprising a fourth contact surface,
wherein the dual pressure detector is configured to detect a second change in pressure of the medium based on whether the third contact surface and the fourth contact surface are in electrical communication.

10. The dual pressure detector of claim 9, comprising:
a housing coupled to the access tube to receive the medium;
wherein the first and second bellows are within the housing.

11. The dual pressure detector of claim 9, comprising:
first and second housing coupled to the access tube to receive the medium;
wherein the first and second bellows are respectively within the first and second housing.

* * * * *